(No Model.)  2 Sheets—Sheet 2.
R. CHESNUT.
TRUCK FOR MOVING REAPERS.
No. 271,221. Patented Jan. 30, 1883.
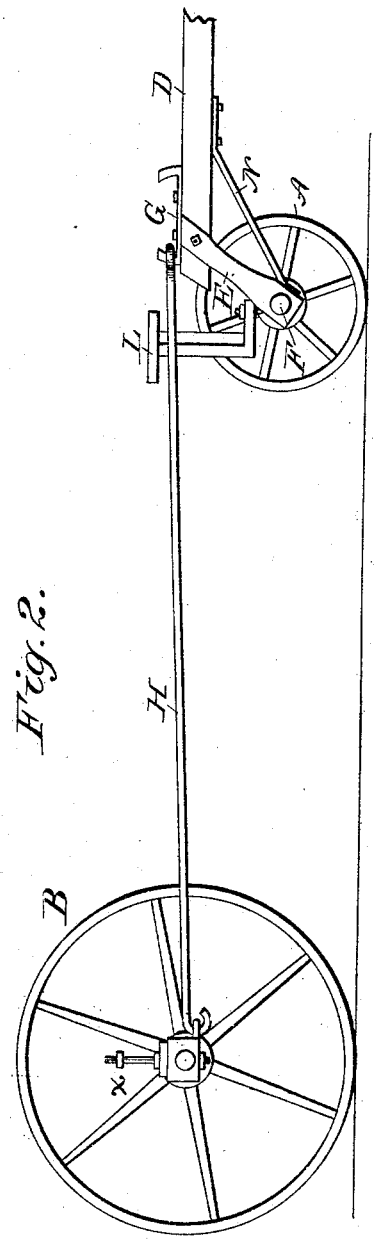
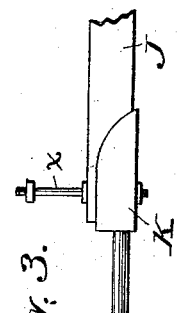
Witnesses.
Charles J Geier
John T. Deal
Inventor.
Robert Chesnut
by W T Dennis
Attorney

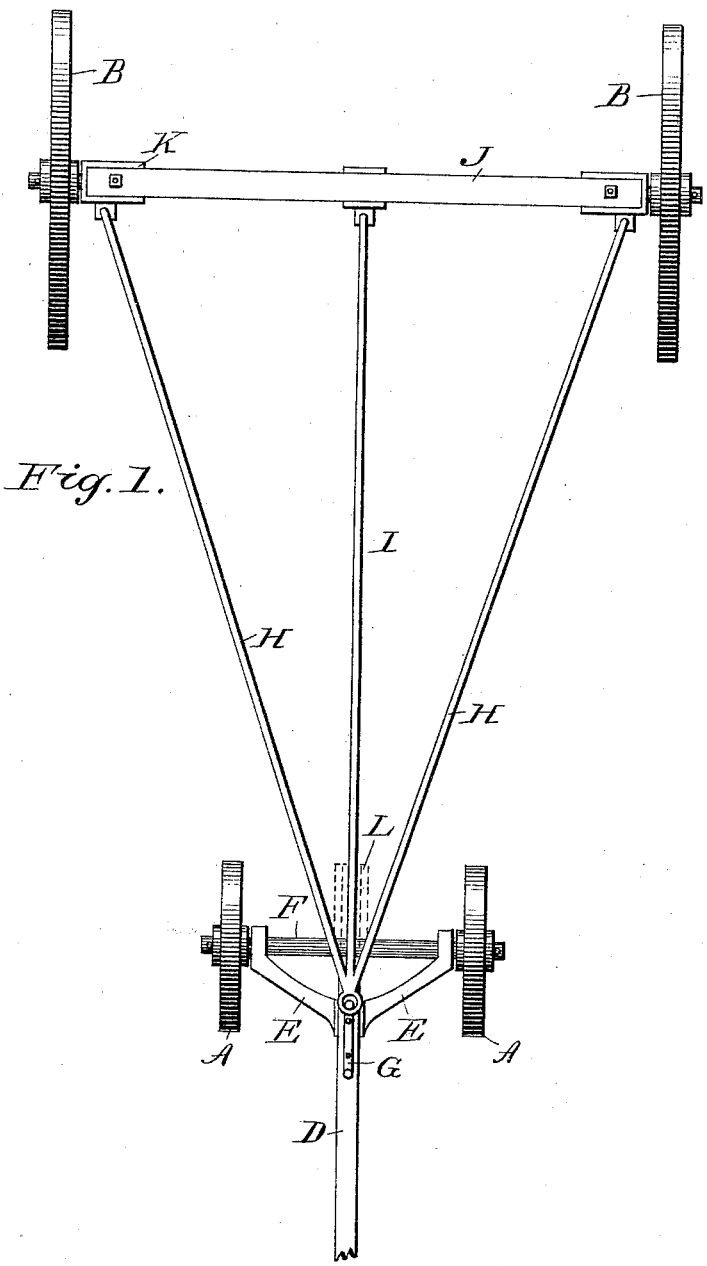

UNITED STATES PATENT OFFICE.

ROBERT CHESNUT, OF RICHMOND, INDIANA.

TRUCK FOR MOVING REAPERS.

SPECIFICATION forming part of Letters Patent No. 271,221, dated January 30, 1883.

Application filed September 30, 1882. (No model.)

*To all whom it may concern:*

Be it known that I, ROBERT CHESNUT, a citizen of the United States, residing at Richmond, in the county of Wayne and State of Indiana, have invented certain new and useful Improvements in Carriages and Trucks for Self-Binding Reapers and other Machines, of which the following is a specification, reference being had therein to the accompanying drawing.

My invention relates to that kind of carriages and trucks used in the movement of self-binding reapers and other similar machines.

My invention consists in providing the front trucks of a self-binding reaper with a connection and bearing for the rear truck and superincumbent frame in front of the axle of the truck, and in placing the point of draft and resistance above and in front of said axle.

It further consists in placing at the center of said axle a pedestal which forms a bearing for the tongue or front frame-work of any implement which may be attached to said trucks.

In the drawings, Figure 1, Sheet 1, is a top view of my improved truck and its connections with the rear wheels and axle forming the entire carriage. Fig. 2, Sheet 2, is a side elevation of the same. Fig. 3, Sheet 2, is a view of the axle-arm of the rear wheel and of the axle attached to the same.

In the drawings like figures of reference refer to like parts.

A A, Fig. 1, are the wheels of the truck or front carriage. F is the axle thereof, and E E are curved converging arms or hounds, formed upon and rigidly attached to the axle F at a point near the hub of the wheel A. The hounds or arms E E are inclined upward and forward from their point of connection with the axle F, and are joined at the top by a plate, rigidly connecting the upper ends of the same, forming an open box having three plain surfaces, into which the rear end of the tongue is fitted and secured.

G is a hooked plate, the base of which is straight and secured to the upper surface of the tongue at or near its junction with the upper ends of the arms E E, each end of said plate being turned up at right angles with its base, the same forming hooks or pins, the forward one of which serves to hold the doubletrees of the team, while the rear one receives the connecting-rods H H and the perch or coupling I.

H H are connecting-rods extending from axle J of the rear wheels, near its junction with them, joined together at their front ends, forming an eye which is fitted and passes over the hook at the rear end of the hooked plate G.

I, Fig. 1, is a perch or coupling-pole attached to the center of the axle J, and, extending forward centrally between the rods H H, is connected with the front ends of the same, and forms a part of the eye passing over the rear hook of the plate G.

D is the tongue of the truck, secured in its position by its attachment to the upper ends of the arms E E, as already described, and also by the stay-rod N, which is bolted to the under side, and extends to the axle F and secured to it.

L is a pedestal having a lug extending from the lower end at right angles, through which an eyebolt passes, securing the same to the axle F. The pedestal is provided with a top surface suitable to form a bearing for the tongue or front framing of any implement or machine which may be attached to the truck, as may be seen in Fig. 2, Sheet 2.

In Fig. 3, Plate or Sheet 2, J represents a section of the axle, and K the axle-arm and spindle, the arm being provided with a recess to receive the axle, which is held in position by the bolt $x$, which may be allowed to extend upward to secure the framing which it is intended to carry.

It will be seen that the rear axle and wheels may be disconnected from the truck by raising the front end of the tongue D and carrying the same over backward until the eye of the rods H H will slip off of the hook on plate G, and in a similar manner the same may be again connected, and the connection and bearing, by means of the hooked plate G, being placed forward of the axle, a steady carriage is produced and any tilting and accidental uncoupling prevented.

Having thus fully described my invention, what I desire to secure by Letters Patent is—

1. The curved arms E E, when inclined upward and forward in the manner and for the purpose as herein set forth.

2. The arrangement and combination of the wheels A A, axle F, arms E E, stay-rod N, and tongue D, substantially as described.

3. The pedestal L, in combination with the axle F, connected and operating as described.

4. In carriage or truck, the rods H H and I, joined at their front ends, in combination with the hooked plate G, in the manner and for the purposes set forth.

In testimony whereof I affix my signature in presence of two witnesses.

ROBERT CHESNUT.

Witnesses:
W. T. DENNIS,
D. B. STRATTAN.